Figure 1:
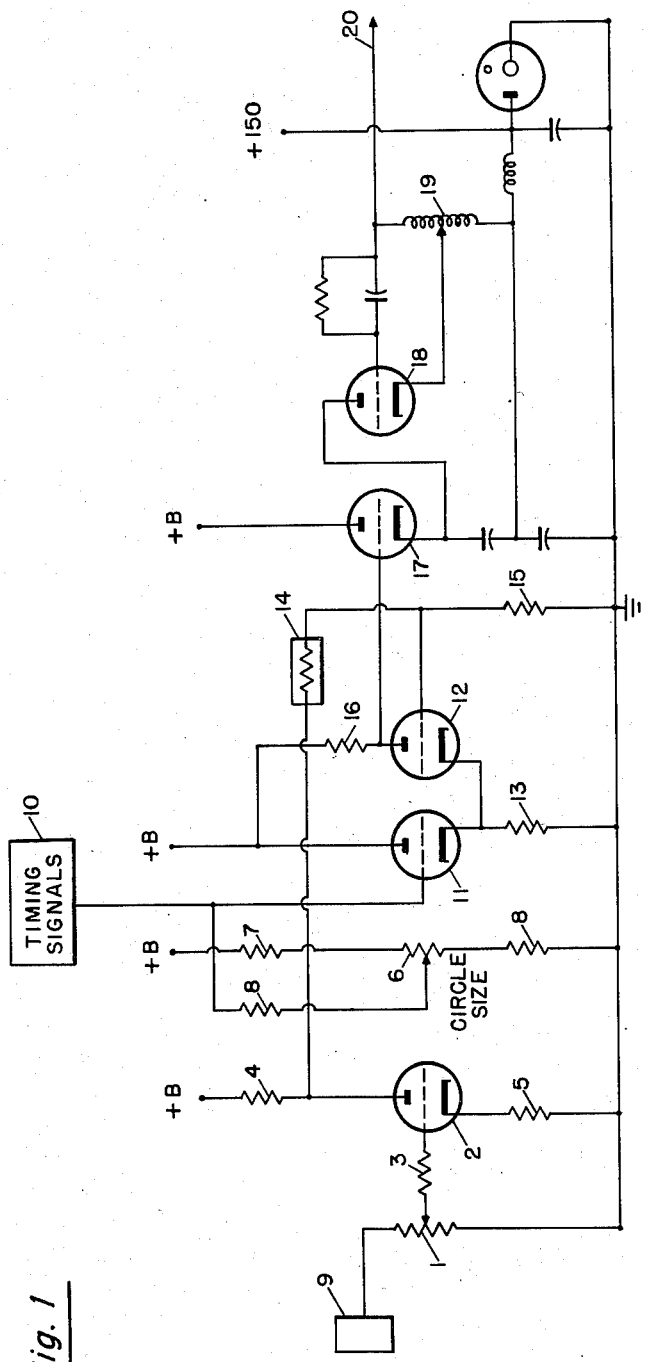

INVENTOR.
MARK NADIR

INVENTOR.
MARK NADIR
BY Darby & Darby
ATTORNEYS

Patented Sept. 16, 1952

2,611,105

UNITED STATES PATENT OFFICE 2,611,105

DEFLECTION CIRCUIT FOR CATHODE-RAY OSCILLOGRAPHS

Mark Nadir, New York, N. Y., assignor to Allen B. Du Mont Laboratories, Inc., Clifton, N. J., a corporation of Delaware Application November 1, 1950, Serial No. 193,377

2 Claims. (Cl. 315—24)

This invention relates to a new and improved circuit for use with a cathode ray tube. By means of this circuit the beam of the cathode ray tube is caused to produce a circular trace on the screen thereof having a diameter which may be adjusted and upon which may be impressed one or more signals as desired.

It is often desired to portray a phenomenon on the screen of a cathode ray tube by means of a display on a circular trace upon which timing markers may also be super-imposed. A circular scan has an advantage of being approximately three times as long as a conventional horizontal scan for the same diameter tube face. It is particularly advantageous when phenomena in connection with rotating machinery are to be observed, and instantaneous angular positions determined by means of synchronized timing or position markers. Phase splitting circuits hitherto used are not operable over a wide range of rotational speeds or frequencies and for extremely low speeds become impractical because of the physical size of the components required.

Accordingly, it is an object of this invention to provide means for producing signals which when applied to the deflection plates of a standard cathode ray tube cause the beam thereof to trace a circle on the fluorescent screen thereof.

It is a further object to provide a circuit to which a plurality of signals may be applied to cause indications to appear on the circular trace.

Additional objects will become apparent after studying the specification in connection with the drawing, in which the single figure on two sheets is a schematic diagram of one embodiment of the invention.

In the drawing, Fig. 1, there is shown a potentiometer 1, to one side of which a lead carrying signals from a source of signals 9 to be displayed is connected, the other side being grounded. The contact arm of this potentiometer is connected to the grid of an amplifier tube 2 through a grid current limiting resistor 3. A plate load resistor 4 is connected between the plate and a source of potential and a cathode bias resistor 5 is connected between the cathode and ground.

A potentiometer 6 is connected between two resistors 7 and 8 and this series combination is connected between a source of positive potential and ground. The movable contact of this potentiometer is connected through a resistor 8 to the grid of tube 11. This grid is also connected to a source of timing signals 10.

The cathode of tube 11 is also connected to the cathode of a mixer tube 12 and to ground through a resistor 13, and its plate is connected directly to a source of positive potential.

The output of the amplifier tube 2 is connected through a non-linear resistive element 14 to the grid of the mixer tube 12 which is also connected to ground through resistor 15. The use of this non-linear element as a coupling element results in a non-linearity which partly compensates for the non-linearity of a modulator tube 17 to which the output voltage developed across plate load resistor 16 is connected.

The cathode of this modulator tube 17 is connected directly to the plate of an oscillator tube 18 connected as a conventional oscillator, which may oscillate, for example, at a frequency in the vicinity of 5 megacycles. Since the plate of the oscillator derives its power from the cathode of tube 17, tube 17 acts as a modulator.

Figure 1A:
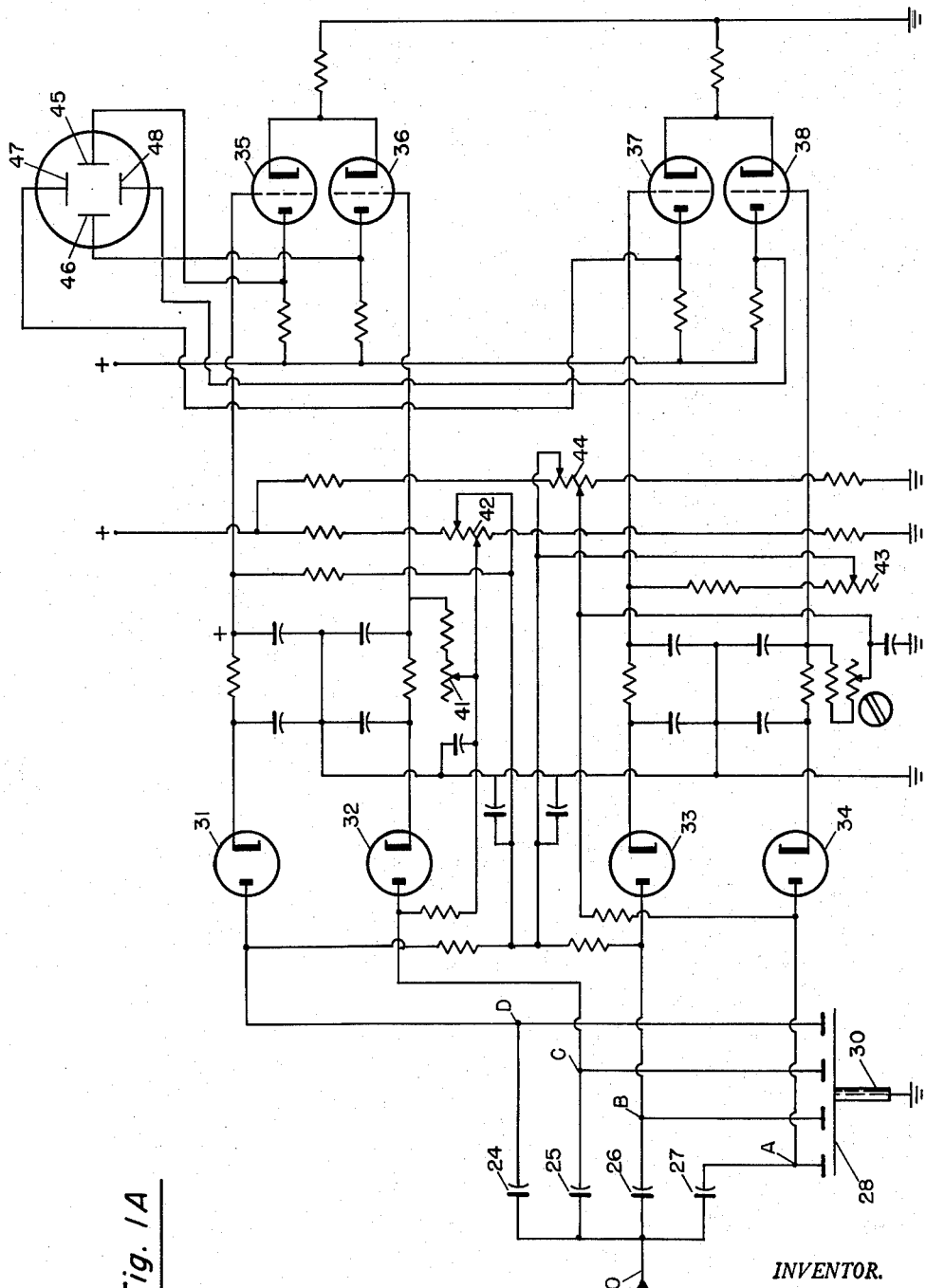

The output of the oscillator coil 19 taken from the grid end thereof, is fed through lead 20 into four capacitive voltage divider circuits formed by the combinations of capacitors 24, 25, 26 and 27 with capacitor 28, respectively (shown in Fig. 1a). Capacitor 28 is a special form of variable capacitor in which the elements vary the capacity sinusoidally and in which there are four rotors or stators spaced 90 electrical degrees apart. It is mechanically driven by shaft 30 in synchronism at some multiple, which may be unity, with the machinery to be observed and with the source of timing signals 10. The voltages appearing at points A, B, C, and D are fed to rectifiers 31, 32, 33, and 34, respectively. The D. C. voltages developed in these rectifiers are filtered and applied directly to the grids of D. C. amplifier tubes 35, 36, 37 and 38.

At this point, suitable D. C. voltages may be added to position and center the beam of the cathode ray tube by means of potentiometers 41 and 42 for the X-axis, and potentiometers 43 and 44 for the Y-axis, in a manner well known to the art.

The plates of the D. C. amplifier tubes 35 and 36 are connected directly to the X-axis deflection plates 45 and 46 respectively of the cathode ray tube 50, while the plates of the D. C. amplifier tubes 37 and 38 are connected directly to the Y-axis deflection plates 47 and 48, respectively.

The operation is as follows:

A signal, or a plurality of signals to be displayed, which may be derived from rotating machinery, indicated in block form at 9, are applied to the input potentiometer 1, amplified by amplifier 2 and applied to the grid of mixer tube 12. At the same time, a steady D. C. voltage, controlled by potentiometer 6 is applied to the grid of amplifier tube 11. This voltage may have superimposed upon it a series of timing pulses, applied from a suitable source 10, which will produce timing markers on the circular trace on the cathode ray tube screen. Since tubes 11 and 12 have a common cathode resistor, the steady D. C. voltage as well as the timing pulses superimposed thereon cause a variation of the potential existing at the plate of the mixer tube 12. In addition there is a signal due to the application to the grid of the signal from tube 2.

These signals are applied directly to the grid of the modulator tube 17 and serve to vary the potential applied to the oscillator tube 18, thus changing the output accordingly.

The modulated output applied to the capacitive voltage divider is successively applied in accordance with the rotation of the special capacitor 28 to the rectifiers 31 through 34. The rectified output from these rectifiers, plus the positioning voltages, is applied to the deflection plates and causes the beam to trace a circle on the screen, the diameter of which is controlled by the steady D. C. voltage applied by potentiometer 6. This is faithfully transmitted through all the amplifiers because of the D. C. connections. The input signal and the timing markers also are transmitted and cause the beam to be deflected outwardly with a positive signal applied.

The timing markers being synchronized with the rotating condenser serve, if rotating machinery is being observed, to indicate accurately the instantaneous angular position of the prime mover which drives the mechanical system. It is to be understood that these timing markers may be produced at a multiple or sub-multiple of the prime mover or special capacitor 28 for greater precision of measurement. It is also to be understood that the special capacitor 28 may be driven at a multiple or sub-multiple of the prime mover so that a portion of the cycle or several cycles of the prime mover may be displayed over 360° on the tube face, appropriate beam blanking being applied to minimize confusion.

While a preferred embodiment of the invention has been described, other embodiments may be apparent without departing from the spirit and scope thereof as defined in the appended claims.

What is claimed is:

1. In a cathode ray oscillograph, a cathode ray tube, a mixer circuit, source of signals connected to said mixer circuit, a source of timing signals connected to said mixer circuit, and a source of unidirectional potential adjustable in magnitude also connected to said mixer circuit, a modulator tube, a radio frequency oscillator, the output of said mixer circuit being connected to said modulator tube to modulate said oscillator, a cyclically variable capacitive voltage divider, the output of said oscillator being connected to said voltage divider producing four output voltages with a ninety degree phase relation existing therebetween, a rectifier connected to said voltage divider, an amplifier connected to said rectifier and to the four deflection plates of said cathode ray tube to cause the beam thereof to describe a circular trace on the screen thereof, the radius of said circular trace being variable in accordance with said adjustable potential to provide a circular base line, said signals and said timing signals each producing a change in said radius.

2. The device of claim 1 including a non-linear resistance element connected between said source of signals and said mixer circuit to compensate for non-linearity of said modulator tube.

MARK NADIR.

REFERENCES CITED

The following references are of record in the file of this patent:

UNITED STATES PATENTS

| Number | Name | Date |
|---|---|---|
| 2,275,974 | Mathes | Mar. 10, 1942 |
| 2,350,069 | Schrader et al. | May 30, 1944 |
| 2,421,747 | Engelhardt | June 10, 1947 |